J. Lusk, Jr.,
Clamp for Castrating Animals.
Nº 65,407. Patented June 4, 1867.

Witnesses:
J. T. Cook
Otto L. Johnson

Inventor:
John Lusk Jun.

UNITED STATES PATENT OFFICE.

JOHN LUSK, JR., OF ECKFORD, MICHIGAN.

IMPROVED TOURNIQUET-CLAMP.

Specification forming part of Letters Patent No. 65,407, dated June 4, 1867.

*To all whom it may concern:*

Be it known that I, JOHN LUSK, Jr., of the town of Eckford, in the county of Calhoun and State of Michigan, have invented a new and useful Improvement on Tourniquet-Clamps, to be used in castrating sheep and other farm-animals; and I do hereby declare that the following is a full, clear, and exact description of the same, reference being had to the annexed drawings, making a part of this specification, in which—

Figure 1:
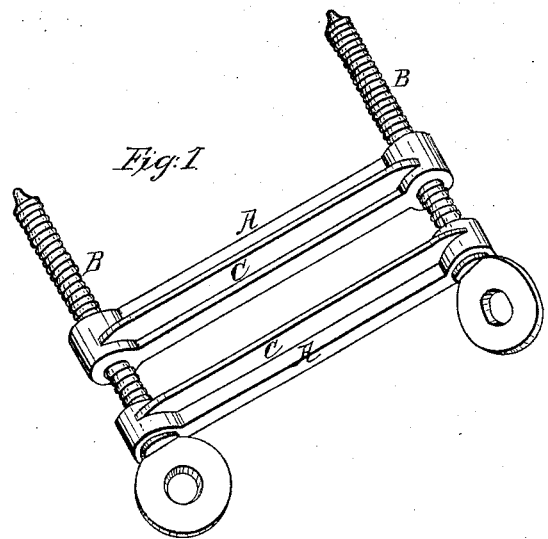
Figure 2:
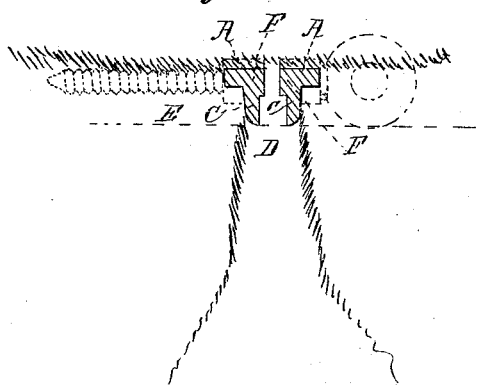

Figure 1 is a perspective view of the clamps in reverse position. Fig. 2 is a cross-section through the center.

The object of my invention is to furnish farmers and others with an instrument for compression, by the aid of which the operation of castration on farm-animals can be performed by any inexperienced person with uniformly safe results, and in such manner as to produce speedy cicatrization of the wound, with comparatively small loss of flesh to the animal; and the better to enable others skilled in this branch of veterinary science to construct and use the same, I will now proceed to describe it.

My improved clamps consist of two light metal bars, A, usually of malleable cast-iron, fitted at each end by a thumb-screw bolt, B, by the turning of which the clamping-bars are caused to approach to or recede from each other in a manner too well known to require any detailed description. Each bar is provided with what I term a "cutting guide-lip," C, which is simply a thinnish flange, from a quarter to half an inch in depth, in general, cast on the bar a little distance inside of the main compressing-face, (indicated at F,) and extending its whole length.

The drawings represent the proportions I usually employ in clamps for altering grown rams; but for bulls and other animals with fibers of greater power of contraction, an increased bearing-surface is desirable.

The mode of operating with my improved clamps is as follows: The upper part of the bag or scrotum D of the animal is inclosed between the two clamping-bars, adjusted in line. The thumb-screws are then turned so as to compress the scrotum between the bars evenly, and with sufficient uniform pressure to stop the circulation, where they are left for about twenty-four hours, in general undisturbed. At the end of that time the portion of the scrotum compressed by the clamps will have shrunk a little, when the operator, provided with a sharp knife, first tightens up the screws, and then, drawing the knife along the edges of the cutting guide-lips, in the line E, he amputates the parts below. The animal is then set at liberty, with the clamps attached to him for a sufficient time to allow the parts to adhere, usually twenty-four hours for a grown ram, when he is caught and the clamps unscrewed and carefully removed, in which there is not the least difficulty, provided the contact-faces of the bars were well oiled previous to attachment.

I am aware that veterinary surgeons have long employed tied wooden splints to stop the circulation in horses before castrating, and that the substitution of plain metal bars operated by screws would hardly be deemed a patentable novelty; but in my improved clamps the effect produced by the cutting guide-lips on the whole process of the operation gives to my instrument a distinctively useful and novel character. In the case of sheep the practice has been to tie a cord around tightly and leave the parts below to die and slough away, which causes prolonged suffering and loss of flesh, besides leaving an ugly bunch of a scar, over which the shears cannot pass. My arrangement safely permits the removal of the entire scrotum, for the instrument cannot slip off after amputation until the parts are united, by reason of the shoulder formed at the intersection of the cutting-lip C with the main compressing-bar A. The space between the lips is designed to be enough greater than between the clamps proper to just hold that portion of the scrotum interposed sufficiently firm against the knife to enable it to make a clean cut, and yet leave sufficient freedom to allow the parts between to shrink back against the more tightly compressed part above, to secure a more perfect union in the shortest time before the removal of the clamps. When the clamps are removed the thicker flap that is formed between the cutting guide-lips forms, in fact, a clinch upon the thinner and more compressed flap above, and when the cicatrix is formed and the flaps disappear, it is difficult, by a mere examination of the locality, to distinguish a wether made by the use of my tourniquet-clamps, as described, from a ewe.

I do not claim, broadly, the use of screw compression for stopping the circulation by clamping-bars or otherwise, for that is old; but What I do claim, and desire to secure by Letters Patent, is—

The tourniquet-clamps A, provided with cutting guide-lips C, and operated by thumb-screws B, substantially in the manner and for the purpose herein described and set forth.

JOHN LUSK, JR.

Witnesses:
 C. T. COOK,
 OTTO L. JOHNSON.